United States Patent
Shatara et al.

(10) Patent No.: US 7,720,184 B2
(45) Date of Patent: May 18, 2010

(54) TECHNIQUE FOR REDUCING MULTIPATH DISTORTION IN AN FM RECEIVER

(75) Inventors: Raed S. Shatara, Carmel, IN (US); Mathew A. Boytim, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1270 days.

(21) Appl. No.: 11/201,718

(22) Filed: Aug. 11, 2005

(65) Prior Publication Data

US 2007/0036249 A1 Feb. 15, 2007

(51) Int. Cl.
*H04B 7/10* (2006.01)
*H04L 1/02* (2006.01)

(52) U.S. Cl. .................. 375/347; 375/348; 375/349; 375/267

(58) Field of Classification Search .................. 375/347, 375/267, 285; 455/278.1, 279.1, 283
See application file for complete search history.

(56) References Cited

U.S. PATENT DOCUMENTS

| | | | |
|---|---|---|---|
| 4,797,950 A * | 1/1989 | Rilling | ..................... 455/276.1 |
| 5,517,686 A | 5/1996 | Kennedy et al. | |
| 5,710,995 A * | 1/1998 | Akaiwa et al. | ............ 455/277.2 |
| 6,728,307 B1 | 4/2004 | Derryberry et al. | |
| 6,763,062 B1 | 7/2004 | Kohno et al. | |
| 7,221,925 B2 * | 5/2007 | Wildhagen | ................... 455/312 |
| 7,260,370 B2 * | 8/2007 | Wang et al. | .................. 455/135 |
| 2005/0128159 A1 | 6/2005 | Wang et al. | |

OTHER PUBLICATIONS

EP Search Report dated Nov. 5, 2006.

\* cited by examiner

*Primary Examiner*—Chieh M Fan
*Assistant Examiner*—Qutbuddin Ghulamali
(74) *Attorney, Agent, or Firm*—Jimmy L. Funke (57) ABSTRACT

A technique for reducing multipath distortion in a mobile FM receiver with a plurality of antennas is accomplished through a number of steps. Initially, a first antenna signal and a second antenna signal are received. The first antenna signal is weighted with a variable first weight and the second antenna signal is weighted with a variable second weight. The weighted first antenna signal and the weighted second antenna signal are then combined to provide a combined received signal having a combined signal level. The variable first and second weights are determined by an adaptation strategy that is substantially controlled by a first algorithm, when the combined signal level is greater than a predetermined signal level. When the combined signal level is less than the predetermined signal level, the variable first and second weights are determined by an adaptation strategy substantially controlled by a second algorithm.

21 Claims, 8 Drawing Sheets

TECHNIQUE FOR REDUCING MULTIPATH DISTORTION IN AN FM RECEIVER

TECHNICAL FIELD

The present invention is generally directed to an FM receiver and, more specifically, to a technique for reducing multipath distortion in an FM receiver having antenna diversity.

BACKGROUND OF THE INVENTION

As is well known, multipath interference is caused when two or more signal rays of an original transmitted signal converge upon a receiving antenna of a receiver at significantly different times. This misalignment or superposition of signals, which are replicas of the original signal, may cause distortion in audio recovered from the signals. Distortion caused by the multipath interference may be attributable to long delay (e.g., greater than five microseconds between signals) multipath interference or short delay (e.g., less than five microseconds between signals) multipath interference.

Figure 1:
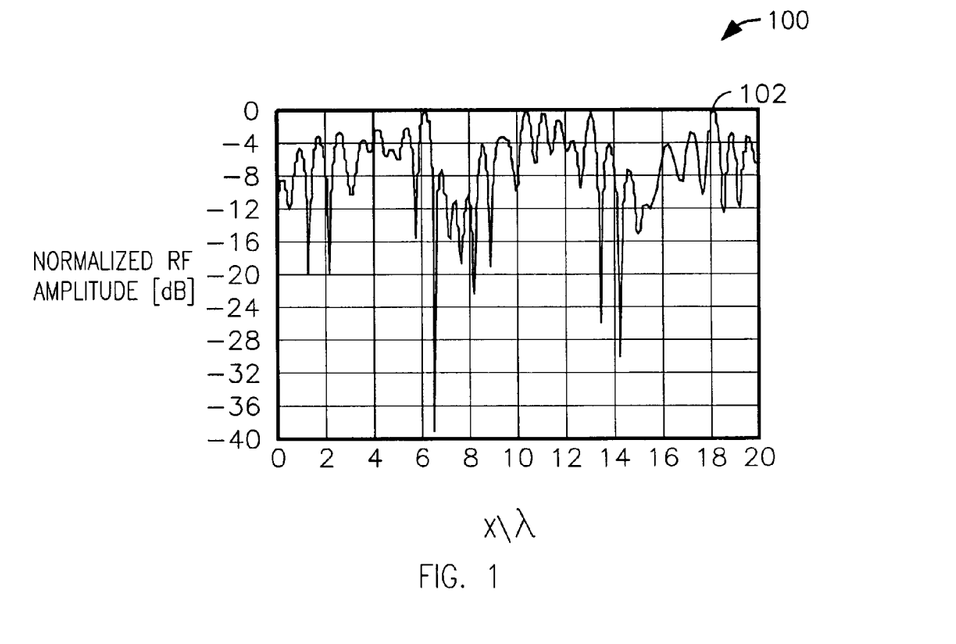
FIG. 1 is a graph depicting a Rayleigh fading field for an exemplary signal.

In a typical urban environment, RF signals experience changes in amplitude and phase due to short delay multipath. This amplitude and phase shift may result in broadband signal fades of up to 40 dB as the receiver and its associated motor vehicle change locations (see FIG. 1, signal 102 of graph 100). At typical highway speeds, signal fluctuation rates in the range of 100 to 1 kHz may occur. In general, long delay multipath (or frequency selective multipath) is found in areas where reflectors are greater than four to five miles away. Typically, long delay multipath occurs in cities with large buildings and in mountainous regions.

Figure 2:
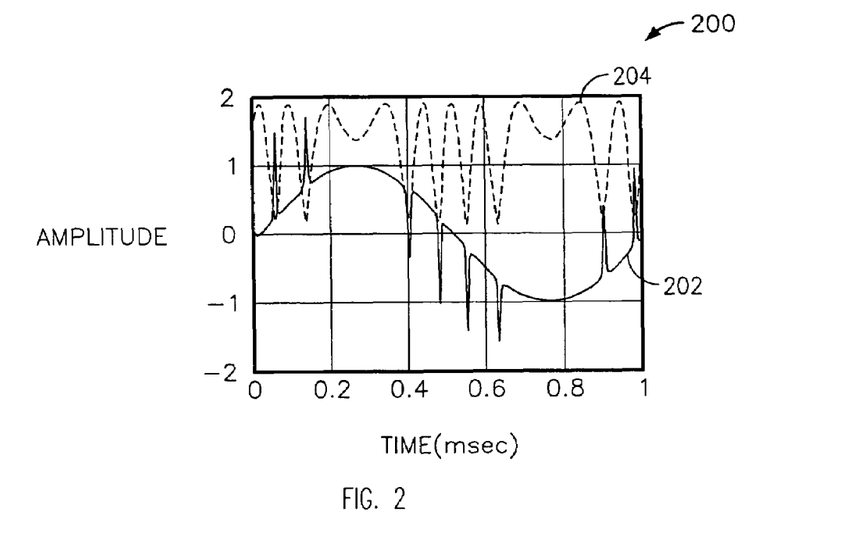
FIG. 2 is a graph depicting audio distortion in a received demodulated signal attributable to long delay multipath interference.

Generally, long and short delay multipath coexists and creates frequency selective fading and broadband fading, simultaneously (see FIG. 2, RF level signal 204 and FM demodulator output (MPX) signal 202 of graph 200, which depicts exemplary audio distortion attributable to long delay multipath).

For example, as is shown in FIG. 2, the signal 202 may contain a 1 kHz tone with a 75 kHz deviation. In such a situation, a reflected signal may have an amplitude of, for example, 0.9 units while a direct signal has, for example, an amplitude of 1 unit. In the case where the time delay of the reflected signal is about 30 microseconds, the distortion attributable to the time delay may be on the order of approximately twelve percent.

In various receiver systems, antenna diversity has been implemented in conjunction with an FM receiver to reduce degraded reception performance caused by multipath interference. Typically, antenna diversity has been accomplished through the use of at least two uncorrelated antennas. Prior art antenna diversity reception for mobile communication systems has been achieved by implementation of a number of different systems. For example, antenna diversity has been accomplished with equal gain combiner (EGC) systems, maximal ratio combiner (MRC) systems and antenna diversity systems, such as the adaptive reception system (ARS) disclosed in U.S. Pat. No. 5,517,686, the disclosure of which is hereby incorporated herein by reference in its entirety.

In general, EGC systems and MRC systems outperform switched antenna diversity systems. However, EGC and MRC systems tend to be more expensive to implement, as they require multiple analog front-ends. Typically, EGC and MRC systems attempt to optimize certain characteristics of a received signal in order to minimize the number of fades or maximize the desired signal.

In a switched antenna diversity system, only one antenna is utilized for reception at any instant in time and, thus, the non-selected antennas do not contribute to the demodulated signal. In contrast, EGC and MRC systems utilize signals from all antennas through a variety of combining techniques.

Constant modulus algorithm (CMA) systems have been implemented extensively in digital broadcasting. In general, combining signals from multiple antennas advantageously provides antenna directionality, which allows interferers (i.e., multipath rays) to be suppressed by creating a null in the antenna pattern in the direction of the multipath interferer. In such systems, the method for determining the combining weights varies, depending upon the application. In the case of an FM receiver implemented in a mobile application, the combining of the signals is particularly challenging, as an implemented algorithm must adapt as the vehicle moves. In a usual case, adaptation is blind, i.e., there is no cooperation between the transmitter and receiver, and the received signal is an analog signal. As such, signal imperfections are difficult to mask.

Figure 3:
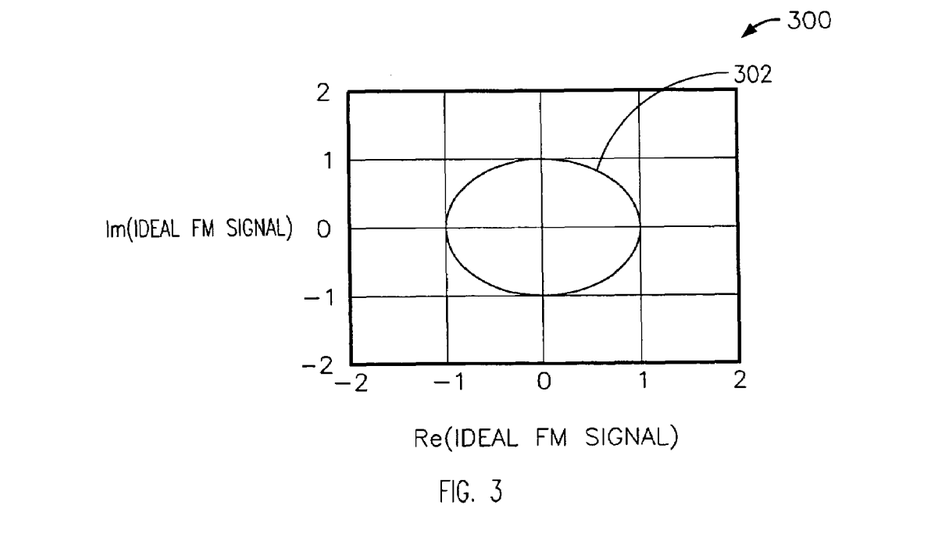
FIG. 3 is a graph of an ideal complex baseband FM signal.
Figure 4:
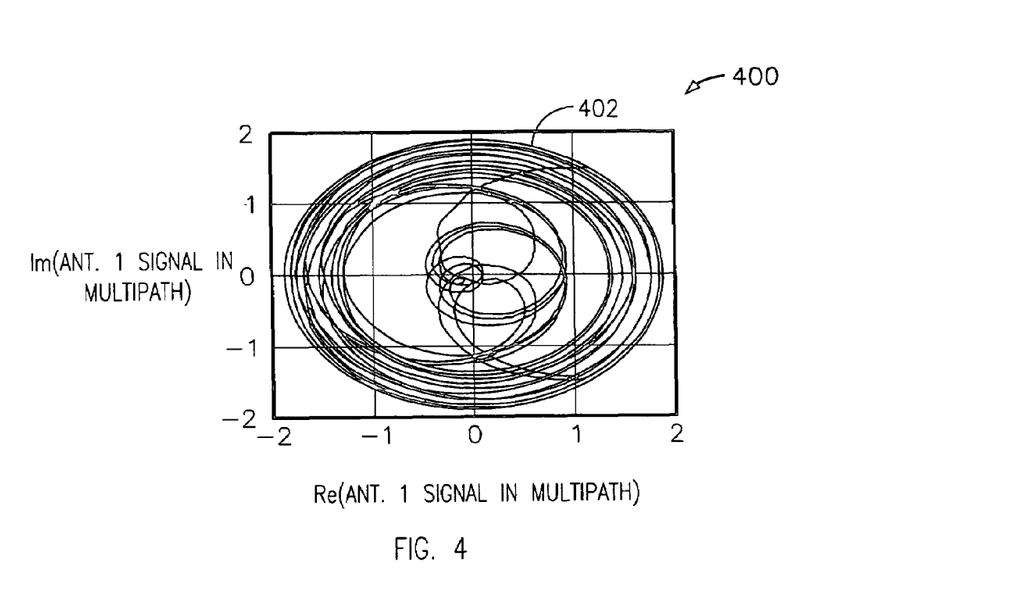
FIG. 4 is a graph of a first antenna signal in the presence of a strong reflection with long delay multipath interference.
Figure 5:
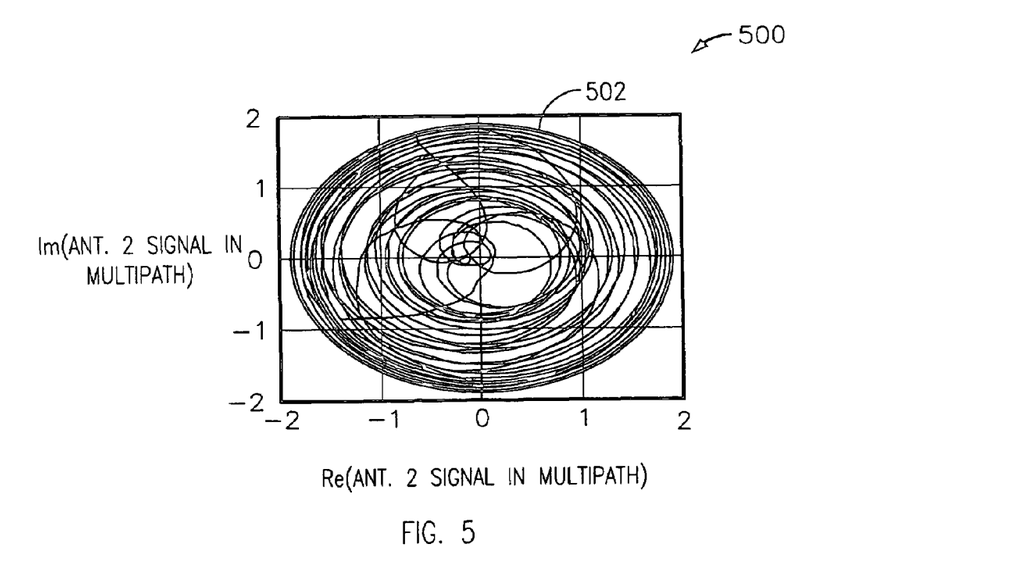
FIG. 5 is a graph of a second antenna signal in the presence of a strong reflection with long delay multipath interference.

However, FM modulated signals initially have a constant modulus (amplitude), which provides prior knowledge about the transmitted signal (see FIG. 3, signal 302 of graph 300). Unfortunately, in a multipath reception environment, a received signal no longer possesses this constant modulus property, as a result of flat or frequency selective fading, and, as such, the complex baseband signal trajectory is no longer a circle but may take the form of a complicated spiro-graph (see FIG. 4, graph 400, with spiro-graph first antenna signal 402, and FIG. 5, graph 500, with spiro-graph second antenna signal 502). Fortunately, in systems that combine antenna signals, the signal amplitude information can be utilized to determine combining weights for the signals from the different antennas.

In general, for narrowband modulation, signal combining may be accomplished by adjusting the amplitudes and phases of the individual antenna signals, prior to summation, to optimize appropriate receiver metrics. The gain and phase applied to each antenna signal is equivalent to complex weighting in the complex baseband model and are referred to as antenna or combining weights. The weighted summation of the individual antenna signals results in an overall reception pattern. The combining method determines the weights which optimize certain receiver metrics. In practice, an iterative solution is generally used to solve for the optimal weights and the system is said to 'adapt'.

The MRC method attempts to maximize some measure of signal-to-noise ratio (SNR) (often called CNR). The CMA method attempts to minimize variation of the received signal amplitude. The CMA method is known to steer the antenna pattern so as to place nulls in the direction of the interfering signals (multipath reflections in this case). The combined antenna pattern varies with the frequency of the received signal so for an FM modulated signal the weights must be adapted rapidly such that the multipath reflection is nulled as it moves in frequency due to the modulation. Because the signal modulation is normally not present in the amplitude of an FM signal, the CMA adaptation bandwidth can extend into the modulation bandwidth such that the adaptation can be fast enough to maintain the necessary null direction as the frequency of the received signal changes due to the modulation.

In general, the CMA method performs well for FM multipath, especially in strong signal conditions where the received distortions are dominated by multipath interference, as opposed to noise. However, as the received signal becomes weak, the amplitude becomes corrupted by noise and the constant modulus assumption of the received signal begins to fail and the CMA performance correspondingly degrades. In addition, the CMA can 'lock' to spurs in the received signal that become unmasked as the desired signal becomes weak. In contrast, the MRC adaptation is influenced by the signal modulation and, thus, the adaptation bandwidth is limited. However, the MRC assumptions remain valid even for weak received signals. Therefore, while the CMA tends to outperform the MRC for strong signals, the CMA may have difficulty with weak signals and, in this case, the MRC tends to yield better and more consistent performance.

Figure 6:
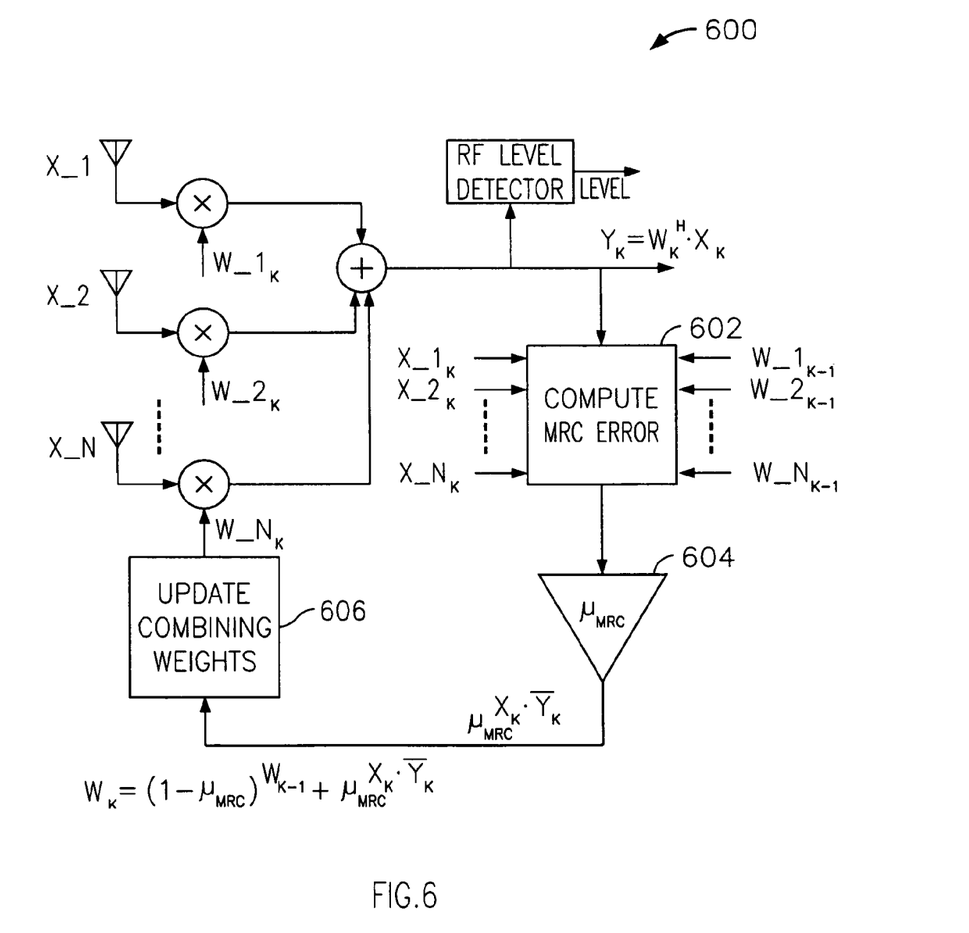
FIG. 6 is a block diagram of a maximum ratio combiner (MRC) algorithm.
Figure 7:
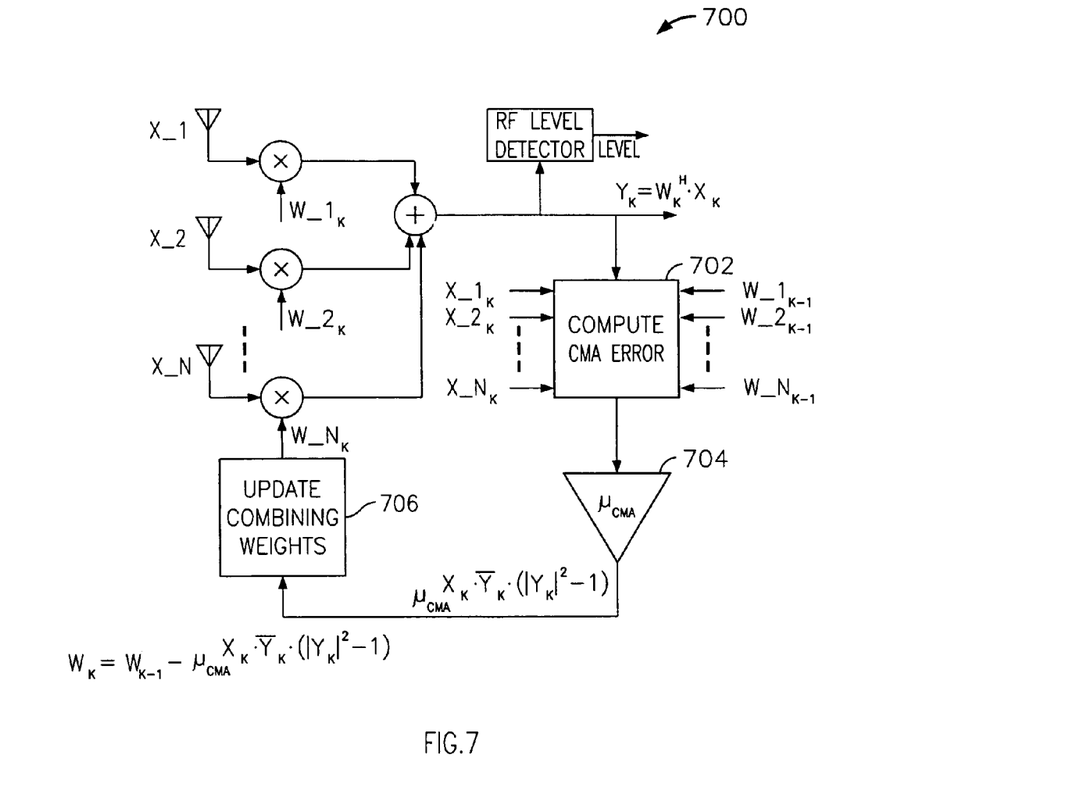
FIG. 7 is a block diagram of a constant modulus (CM) algorithm.

With reference to FIG. 6, an exemplary block diagram 600 of an MRC algorithm includes function blocks 602, 604 and 606, which are implemented in software. With reference to FIG. 7, an exemplary block diagram 700 of a constant modulus algorithm (CMA) includes function blocks 702, 704 and 706, which are implemented in software.

The CMA is a relatively efficient algorithm that allows for adaptation, based on amplitude variation of known constant amplitude signals. In a two antenna case with a single interferer, it is usually possible to position a null in the direction of the multipath interferer (i.e., in the long delay multipath). For an incident plane wave, only the phase of the received signals differ between the two antennas and, thus, combining weights can be found such that the signals cancel in the combined output. While this solution does, in fact, satisfy the constant modulus constraint, it does not guarantee that a system implementing a CMA will adapt to the solution and, in general, the solution may not be unique. For example, a null can be placed in the direction of the direct path and still satisfy the CMA constraint. While this may be acceptable, as noted above, the assumption of constant modulus degrades as the received signal becomes weak, as noise violates the constant modulus property. Furthermore, the wide adaptation bandwidth, which makes the CMA effective in long delay multipath, results in noisy adaptation for weak signals.

What is needed is an improved technique for reducing multipath distortion in a mobile FM receiver having multiple antennas.

SUMMARY OF THE INVENTION

According to one embodiment of the present invention, a technique for reducing multipath distortion in a mobile FM receiver, with a plurality of antennas, includes a number of steps. Initially, a first antenna signal and a second antenna signal are received via a first antenna and a second antenna, respectively. Next, the first antenna signal is weighted with a variable first weight and a second antenna signal is weighted with a variable second weight. The weighted first antenna signal is then combined with the weighted second antenna signal to provide a combined received signal having a combined signal level. The variable first and second weights are determined by an adaptation strategy that is substantially controlled by a first algorithm, when the combined signal level is greater than a predetermined signal level. The variable first and second weights are determined by an adaptation strategy substantially controlled by a second algorithm, when the combined signal level is less than the predetermined signal level.

According to another embodiment of the present invention, the transition between the first and second algorithms is achieved by modifying an adaptation step size, when the variable first and second weights are updated. According to one aspect of the present invention, the first algorithm is a constant modulus algorithm (CMA). According to another aspect of the present invention, the first algorithm optimizes reception, when the first and second antenna signals experience multipath interference, where one of the first and second antenna signals is delayed, with respect to the other of the first and second antenna signals, by about 5 microseconds or more.

According to a different aspect of the present invention, the second algorithm is a maximum ratio combiner (MRC) algorithm. According to another embodiment of the present invention, the second algorithm optimizes a signal-to-noise (SNR) ratio of the first and second antenna signals in a fading multipath environment during weak signal conditions, when the signal is less than the predetermined signal level. According to yet another aspect, the second algorithm may be one of an MRC algorithm, an adaptive reception system (ARS) algorithm and an equal gain combiner (EGC) algorithm.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

The CMA solution is typically solved iteratively using a gradient descent approach that naturally leads to a least mean square (LMS) like update of the combining weights. The adaptation consists of adding small updates to the combining weights so as to reduce the associated error. The MRC solution can be solved in a similar way such that the weight adaptation consists of updates to the combining weights that minimize the associated error. The updates to the antenna weights are scaled by a parameter called the adaptation step size, usually represented by $\mu$, which controls the rate of convergence and quality of the final solution. By organizing the CMA and MRC solutions to have the identical form, that of LMS-like updates, it is possible to subject the optimal solution to both the CMA and MRC constraints simultaneously by summing both update terms into the weight update. The adaptation step sizes, $\mu_{CMA}$ and $\mu_{MRC}$, then not only control the convergence rate and quality of the solution but the relative emphasis or importance of their corresponding constraint in obtaining the optimal solution. That is, the adaptation effort can be steered between CMA and MRC by adjusting the ratio of $\mu_{CMA}$ and $\mu_{MRC}$.

Figure 8:
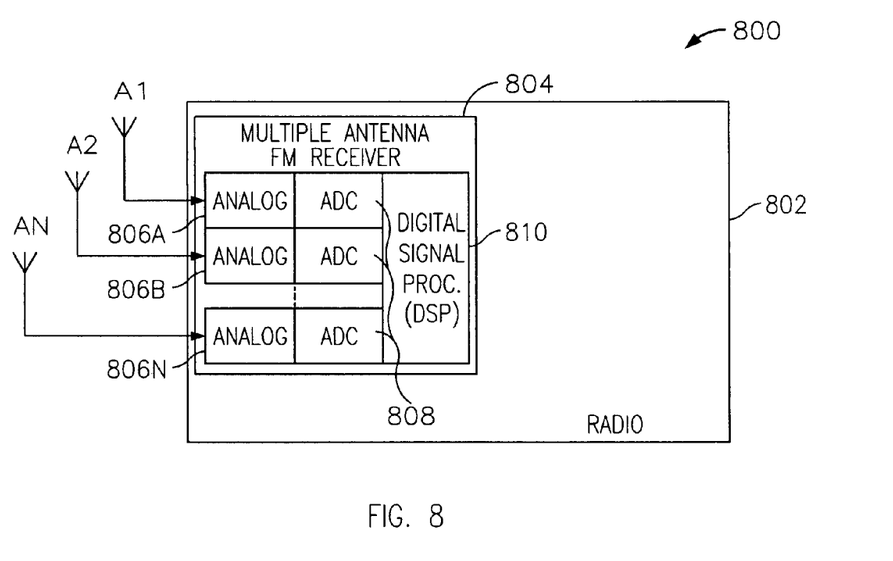
FIG. 8 is a block diagram of an exemplary radio.

According to one embodiment of the present invention, a weak signal strategy is employed for robust operation of an FM receiver, with multiple analog front-ends, over a full dynamic range of a received signal. With reference to FIG. 8, an exemplary receiver system 800 includes a plurality of analog front-ends 806A, 806B through 806N, whose inputs are coupled to associated antennas A1, A1 through AN, respectively. Outputs of the front-ends 806A, 806B through 806N are coupled to an input of a different one of a plurality of analog-to-digital converters (ADCs) 808, whose outputs are provide to a digital signal processor (DSP) 810.

As is discussed above, while the constant modulus assumption becomes poor for weak signals, the maximum ratio combiner (MRC) algorithm assumptions remain valid for all signal levels. Furthermore, while the constant modulus (CM) algorithm is generally superior to the MRC at high-received signal-to-noise ratios (SNRs), the MRC algorithm outperforms the CM algorithm for weak noisy signals. According to one aspect of the present invention, an adaptation strategy is implemented that is substantially controlled by the CM algorithm for strong signals and substantially controlled by the MRC algorithm for weak signals. The transition between the two adaptation strategies is accomplished by controlling adaptation step size $\mu$ in the weight updates equations, according to the received signal strength.

Figure 9:
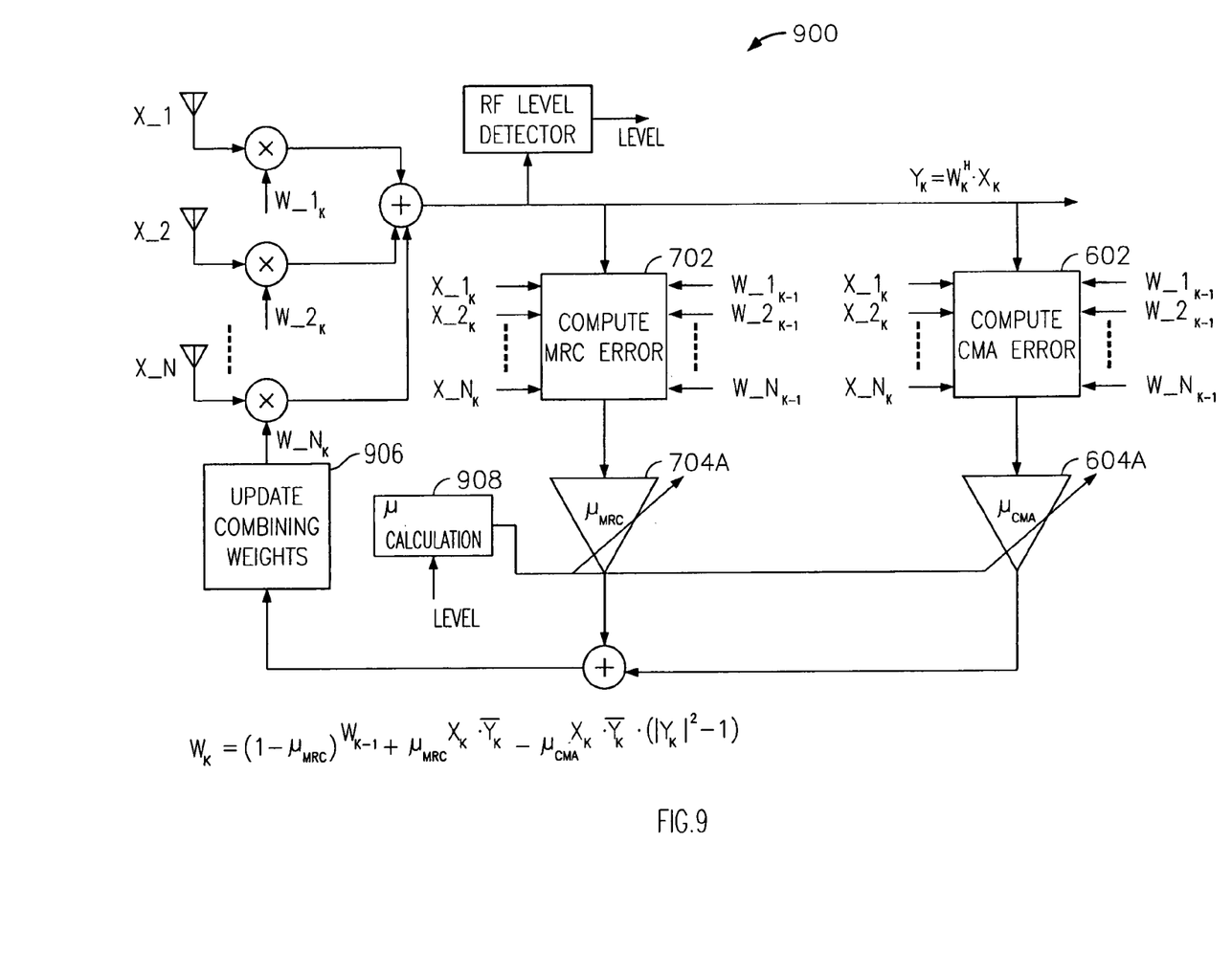
FIG. 9 is a block diagram of an algorithm implemented within a digital signal processor (DSP), according to one embodiment of the present invention, that utilizes the MRC or CM algorithms, dependent upon an RF signal level.

For strong signals, $\mu_{CMA} \gg \mu_{MRC}$, the adaptation is substantially controlled by the CMA. For weak signals, $\mu_{MRC} > \mu_{CMA}$, the adaptation is substantially controlled by the MRC algorithm (see FIG. 9). As is shown in FIG. 9, the MRC/CM algorithm block diagram 900 essentially combines the CM algorithm block diagram 700 (see FIG. 7) and the MRC algorithm block diagram 600 (see FIG. 6). An output of the MRC error block 702 is multiplied by a variable MRC step size block $\mu_{MRC}$ 704A and an output of the CMA error block 602 is multiplied by a variable CMA step size block $\mu_{CMA}$ 604A. The outputs of the blocks 704A and 604A are used to update the combining weights in block 906.

Figure 10:
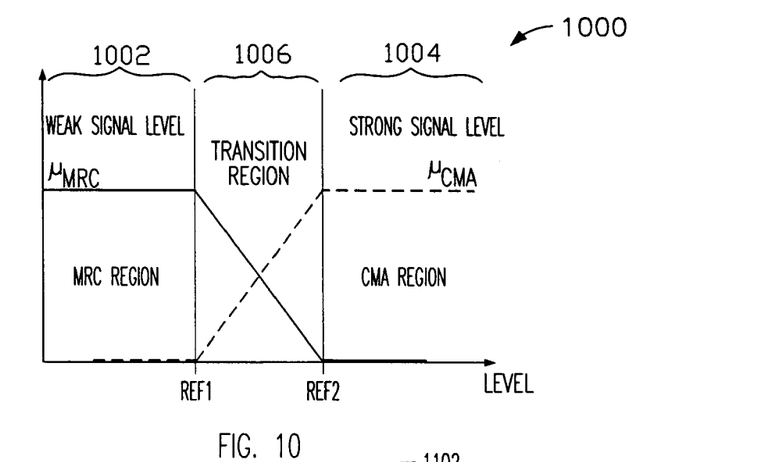
FIG. 10 depicts level dependent regions of operation for the algorithm of FIG. 9.

FIG. 10 depicts a graph 1000 having an MRC region of operation 1002 and a CMA region of operation 1004 for an FM receiver, configured according to the present invention, that transitions between the CM and MRC algorithms in a transition region 1006, dependent upon an RF signal level. To illustrate the performance of the system in a long delay multipath, consider a two-antenna system, with the signals shown in FIGS. 4 and 5. The RF level in this case is above the reference level REF2 and the system is in the CMA mode. When the RF level is below the reference level REF1, the system is in MRC mode. Furthermore, when the RF level is between the reference levels REF1 and REF2, the system is in the transition region 1006.

Figure 11:
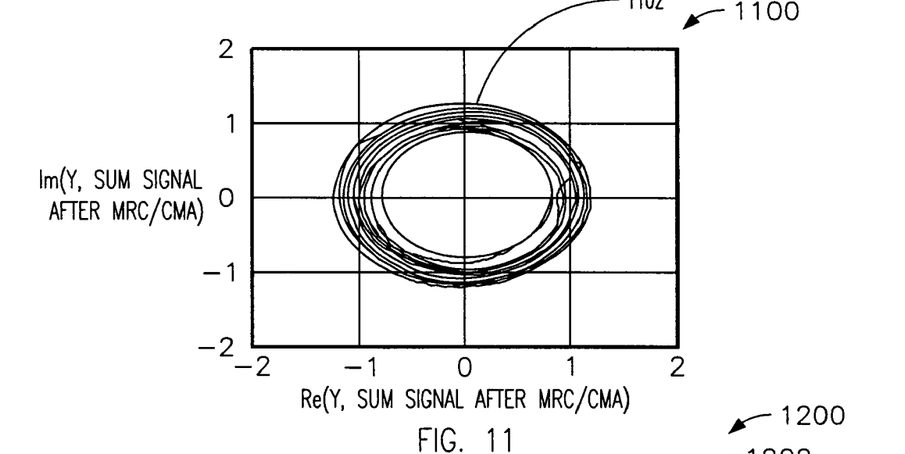
FIG. 11 is a graph depicting the output of the algorithm of FIG. 9 when the system is in a CM algorithm mode.
Figure 12:
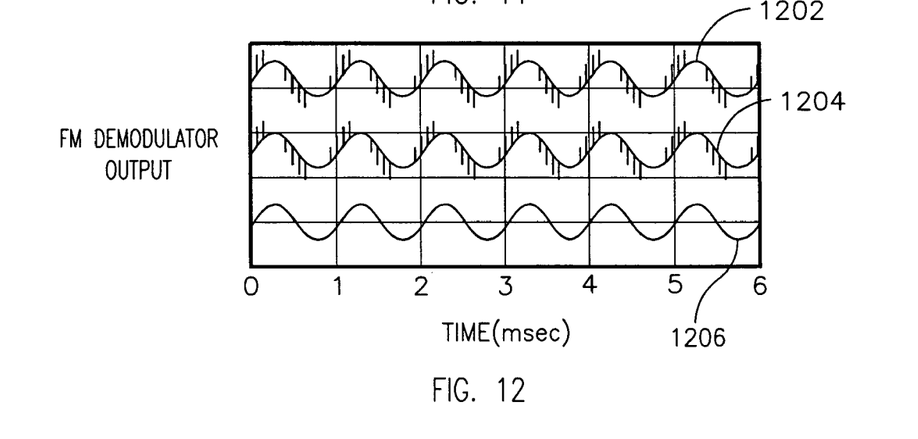
FIG. 12 depicts the audio output of the algorithm of FIG. 9, with reference to the first and second antenna signals.

With reference to the output graphs 1100 and 1200 of FIGS. 11 and 12, respectively, a null has been placed in the direction of the interferer and, thus, the signal quality is improved. For example, while a first antenna signal 1202 and a second antenna signal 1204 have a SNR of about 19 dB and a 10.7 percent distortion, signal 1206 (which is the output of the MRC/CM algorithm) has a SNR of about 53 dB and about 0.22 percent distortion.

With reference again to the block diagram 900 of FIG. 9, the output of the algorithm is given by:

$$Y_k = \overline{W\_1}_k \cdot X\_1_k + \overline{W\_2}_k \cdot X\_2_k + \ldots \overline{W\_N}_k \cdot X\_N_k$$

and the update equations for the weights are given by:

$$W\_1_k = (1-\mu_{MRC})W\_1_{k-1} + \mu_{MRC} \cdot X\_1_k \cdot \overline{Y}_k - \mu_{CMA} \cdot X\_1_k \cdot \overline{Y}_k \cdot (|Y_k|^2 - 1)$$

$$W\_2_k = (1-\mu_{MRC})W\_2_{k-1} + \mu_{MRC} \cdot X\_2_k \cdot \overline{Y}_k - \mu_{CMA} \cdot X\_2_k \cdot \overline{Y}_k \cdot (|Y_k|^2 - 1)$$

$$W\_N_k = (1-\mu_{MRC})W\_N_{k-1} + \mu_{MRC} \cdot X\_N_k \cdot \overline{Y}_k - \mu_{CMA} \cdot X\_N_k \cdot \overline{Y}_k \cdot (|Y_k|^2 - 1)$$

Accordingly, an FM receiver with multiple analog front-ends has been described herein that exhibits improved performance in the presence of multipath interference.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for reducing multipath distortion in a mobile FM receiver with a plurality of antennas, comprising the steps of:
   receiving a first antenna signal via a first antenna and a second antenna signal via a second antenna;
   weighting the first antenna signal with a variable first weight and the second antenna signal with a variable second weight; and
   combining the weighted first antenna signal with the weighted second antenna signal to provide a combined received signal having a combined signal level;
   wherein the variable first and second weight are determined by an adaptation strategy substantially controlled by a first algorithm when the combined signal level is greater than a predetermined signal level, and wherein the variable first and second weight are determined by the adaptation strategy substantially controlled by a second algorithm when the combined signal level is less than the predetermined signal level, and wherein the step of combining the weighted first antenna signal with the weighted second antenna signal further comprises adjusting a first and second adaptation step size, the first adaptation step size being determined by the adaptation strategy substantially controlled by the first algorithm and the second adaptation step size being determined by the adaptation strategy substantially controlled by the second algorithm.

2. The method of claim 1, wherein the transition between the first and second algorithms is achieved by respectfully modifying the first and second adaptation step size when the variable first and second weights are updated.

3. The method of claim 1, wherein the first algorithm is a constant modulus algorithm (CMA).

4. The method of claim 1, wherein the first algorithm optimizes reception when the first and second antenna signals experience multipath interference, where one of the first and second antenna signals is delayed with respect to the other of the first and second antenna signals by about 5 microseconds or more.

5. The method of claim 1, wherein the second algorithm is a maximum ratio combiner (MRC) algorithm.

6. The method of claim 1, wherein the second algorithm optimizes a signal-to-noise ratio (SNR) of the first and second antenna signals in a fading multipath environment during weak signal conditions when the signal is less than the predetermined signal level.

7. The method of claim 1, wherein the second algorithm is one of a maximum ratio combiner (MRC) algorithm, an adaptive reception system (ARS) algorithm and an equal gain combiner (EGC) algorithm.

8. The method of claim 1, wherein the first algorithm is a constant modulus algorithm (CMA) and the second algorithm is a maximum ratio combiner (MRC) algorithm.

9. The method of claim 1, wherein the first adaptation step size is greater than the second adaptation step size when the combined signal level is greater than the predetermined signal level and the second adaptation step size is greater than the first adaptation step size when the combined signal level is less than the predetermined signal level.

10. A method for reducing multipath distortion in a mobile FM receiver with a plurality of antennas, comprising the steps of:
receiving a first antenna signal via a first antenna and a second antenna signal via a second antenna;
weighting the first antenna signal with a variable first weight and the second antenna signal with a variable second weight; and
combining the weighted first antenna signal with the weighted second antenna signal to provide a combined received signal having a combined signal level;
wherein by adjusting a first and second adaptation step size the variable first and second weight are determined by an adaptation strategy substantially controlled by a constant modulus algorithm (CMA) when the combined signal level is greater than a predetermined signal level, and wherein the variable first and second weight are determined by the adaptation strategy substantially controlled by a maximum ratio combiner (MRC) algorithm when the combined signal level is less than the predetermined signal level, where the CMA optimizes reception when the first and second antenna signal experience multipath interference, where one of the first and second antenna signal is delayed with respect to the other of the first and second antenna signal by about 5 microseconds or more, and where the MRC algorithm optimizes a signal-to-noise ratio (SNR) of the first and second antenna signal in a fading multipath environment during weak signal conditions when the signal is less than the predetermined signal level.

11. The method of claim 10, wherein the transition between the first and second algorithms is achieved by respectfully modifying the first and second adaptation step size when the variable first and second weights are updated.

12. The method of claim 10, wherein the first adaptation step size is greater than the second adaptation step size when the combined signal level is greater than the predetermined signal level and the second adaptation step size is greater than the first adaptation step size when the combined signal level is less than the predetermined signal level.

13. A mobile FM receiver, comprising:
a first front end and a second front end, wherein the first front end is coupled to a first antenna and the second front end is coupled to a second antenna; and
a processor coupled to an output of the first and second front ends, wherein the processor executes code that causes the processor to perform the steps of:
processing a first antenna signal received by the first antenna and a second antenna signal received by the second antenna;
weighting the first antenna signal with a variable first weight and the second antenna signal with a variable second weight; and
combining the weighted first antenna signal with the weighted second antenna signal to provide a combined received signal having a combined signal level, wherein the variable first and second weights are determined by an adaptation strategy substantially controlled by a first algorithm when the combined signal level is greater than a predetermined signal level, and wherein the variable first and second weight are determined by the adaptation strategy substantially controlled by a second algorithm when the combined signal level is less than the predetermined signal level, and wherein the step of combining the weighted first antenna signal with the weighted second antenna signal further comprises adjusting a first and second adaptation step size, the first adaptation step size being determined by the adaptation strategy substantially controlled by the first algorithm and the second adaptation step size being determined by the adaptation strategy substantially controlled by the second algorithm.

14. The receiver of claim 13, wherein the transition between the first and second algorithms is achieved by respectfully modifying the first and second adaptation step size when the variable first and second weights are updated.

15. The receiver of claim 13, wherein the first algorithm is a constant modulus algorithm (CMA).

16. The receiver of claim 13, wherein the first algorithm optimizes reception when the first and second antenna signals experience multipath interference, where one of the first and second antenna signals is delayed with respect to the other of the first and second antenna signals by about 5 microseconds or more.

17. The receiver of claim 13, wherein the second algorithm is a maximum ratio combiner (MRC) algorithm.

18. The receiver of claim 13, wherein the second algorithm optimizes a signal-to-noise ratio (SNR) of the first and second antenna signals in a fading multipath environment during weak signal conditions when the signal is less than the predetermined signal level.

19. The receiver of claim 13, wherein the second algorithm is one of a maximum ratio combiner (MRC) algorithm, an adaptive reception system (ARS) algorithm and an equal gain combiner (EGC) algorithm.

20. The receiver of claim 13, wherein the first algorithm is a constant modulus algorithm (CMA) and the second algorithm is a maximum ratio combiner (MRC) algorithm.

21. The receiver of claim 13, wherein the first adaptation step size is greater than the second adaptation step size when the combined signal level is greater than the predetermined signal level and the second adaptation step size is greater than the first adaptation step size when the combined signal level is less than the predetermined signal level.

* * * * *